(12) United States Patent
Pepperell et al.

(10) Patent No.: US 11,017,497 B2
(45) Date of Patent: May 25, 2021

(54) METHOD FOR PRESERVING PERCEPTUAL CONSTANCY OF OBJECTS IN IMAGES

(71) Applicant: FOVO TECHNOLOGY LIMITED, Cardiff (GB)

(72) Inventors: Robert Pepperell, Cardiff (GB); Alistair Burleigh, Cardiff (GB)

(73) Assignee: FOVO TECHNOLOGY LIMITED, Cardiff (GB)

( * ) Notice: Subject to any disclaimer, the term of this patent is extended or adjusted under 35 U.S.C. 154(b) by 0 days.

(21) Appl. No.: 16/645,314

(22) PCT Filed: Aug. 31, 2018

(86) PCT No.: PCT/GB2018/052471
§ 371 (c)(1),
(2) Date: Mar. 6, 2020

(87) PCT Pub. No.: WO2019/048831
PCT Pub. Date: Mar. 14, 2019

(65) Prior Publication Data
US 2021/0035262 A1 Feb. 4, 2021

(30) Foreign Application Priority Data

Sep. 6, 2017 (GB) ..................................... 1714344

(51) Int. Cl.
*G06T 3/00* (2006.01)
*G06T 7/60* (2017.01)
(Continued)

(52) U.S. Cl.
CPC .............. *G06T 3/0037* (2013.01); *G06T 7/40* (2013.01); *G06T 7/60* (2013.01); *G06T 7/90* (2017.01)

(58) Field of Classification Search
CPC ......... G06T 19/00; G06T 17/20; G06T 17/00; G06T 15/10; G06T 15/00; G06T 3/4007;
(Continued)

(56) References Cited

U.S. PATENT DOCUMENTS

| 8,994,738 B1 | 3/2015 | Hernandez Esteban et al. |
| 2011/0227912 A1 | 9/2011 | Sugama |

FOREIGN PATENT DOCUMENTS

| EP | 2214137 A2 | 8/2010 |
| EP | 3001680 A1 | 3/2016 |
| WO | 99/65224 A2 | 12/1999 |

OTHER PUBLICATIONS

Wenyan, B., et al., "Perceptual Constancy of Mechanical Properties of Cloth under Variation of External Forces," SAP 16, pp. 19-23 (Jul. 22, 2016).

(Continued)

*Primary Examiner* — Todd Buttram
(74) *Attorney, Agent, or Firm* — Polsinelli PC; Elton Dean, III, Esq.

(57) ABSTRACT

A method of modifying a 2D image representing a 3D scene in order to preserve perceptual constancy of objects in the scene the method including the steps: processing an image of a 3D scene to generate an unmodified view of the 3D scene and one or more 3D objects within the scene; selecting one or more objects from within the scene; determining a modified view of the one or more objects; comparing the modified view of the one or more objects with the unmodified view of the one or more objects; interpolating one or more stages between the unmodified view and modified view of the one or more objects; selecting an interpolation for the one or more objects; generating a new 3D scene with the selected interpolated one or more objects; and, projecting and rendering the new 3D scene into a 2D image onto a display.

20 Claims, 5 Drawing Sheets

(51) Int. Cl.
*G06T 7/40* (2017.01)
*G06T 7/90* (2017.01)

(58) Field of Classification Search
CPC ......... G06T 15/80; G06T 3/403; G06T 5/001; G06T 11/001
See application file for complete search history.

(56) References Cited

OTHER PUBLICATIONS

International Search Report of PCT/GB2018/052471 dated Dec. 7, 2018.
Written Opinion of PCT/GB2018/052471 dated Dec. 7, 2018.
Search Report of Great Britain Patent Application No. 1714344.7 dated Jul. 12, 2018.

METHOD FOR PRESERVING PERCEPTUAL CONSTANCY OF OBJECTS IN IMAGES

The present invention is directed to method of preserving perceptual constancy of objects in 2D images of 3D scenes. More specifically the method minimises the distortions caused by standard geometric projections and thereby improve the legibility or appearance of images of 3D scenes.

Computer graphics systems are used widely to generate or process 3D images and animations representing real or imaginary spaces. Such systems normally utilise a graphics pipeline to convert the 3D model of a scene into an image rendered on a display. This pipeline comprises a series of computational processes that mathematically transform spatial coordinates in the 3D model so that they are rendered as pixels at different positions on the display, apply lighting, shadow, and texture information to the objects in the scene, apply imaging effects to regions of the scene, and managing user inputs from control devices such as mice, joy pads, or behavioural sensors like head or eye trackers.

Conventional computer graphics pipelines use the geometry of linear perspective to project the 3D coordinates to the image plane. The equation controlling this projection is normally integrated into the graphics pipeline, either as a function in software or encoded into the computer hardware in the graphics processor units. Other forms of projection can be used to map the 3D data to an image plane, such as fisheye or cylindrical projections, but they are used relatively infrequently for specialised applications.

When projecting 3D coordinates to an image plane, objects that are modelled using the 3D coordinates must be flattened to two dimensions. This means that an object in a scene that is projected onto a 2D image display will been seen by a viewer of the display as a flat image rather than as a solid 3D object, as would be the case if viewed in the real world. Humans are very accustomed to viewing 3D objects as 2D projections in drawings, photographs, movies, and other such media. We are able to rapidly recognise 3D objects in flat images when they are presented obliquely to the line of sight and thus projected on the retina of the eyes in highly distorted form.

When viewing a distorted image of a 3D object we are able to recognise the object by comparing it to the stored memories of similar objects we have accumulated through our life experience, which we will have typically viewed from multiple angles. From these accumulated views we acquire an impression of 'perceptual constancy', meaning that we know the ideal size and shape of an object even when seeing it from a great distance or an unusual angle. As examples, the sun appears to be a large object far away; a disc will appear as a round object even when viewed as an ellipse. As a general principle of visual perception, the perceptual system will attempt to match whatever view of an object is presented to us to an ideal view derived from memory and experience. However, the more distorted or atypical the object appears the more cognitive processing effort and time is required to recognise it and to mentally compensate for the apparent distortion.

In linear perspective projections used as standard in most computer graphics pipelines 3D objects are often presented in distorted form when wide-angle views or special projections are used to display the scene. For example, if a scene is presented using a wide-angle field of view >60° horizontally then objects shown at the edges of the scene will appear horizontally stretched due to the fact that linear perspective projections widen the angle of divergent light paths projecting from the pinhole (virtual or real) as they move away from the centre of the image. If curvilinear projections are used, such as fisheye lens-type projections, then objects can appear to have excessive curvature due to the geometry inherent to that projection, or may appear unnaturally large or small in the scene.

The problem to which the present invention is addressed is the fact that objects often appear unnaturally distorted, magnified or minified in computer graphical images or computer processed images of 3D scenes, and this can detrimentally affect the viewer's experience of the images, make them difficult to interpret, make them aesthetically unattractive, or less comfortable to view. These distortions are the inevitable consequence of the projective geometry used to convert 3D coordinates to 2D images, which in almost all cases constrain the light paths to straight lines diverging from a single pinhole projecting to a plane surface.

Methods have been developed to rectify the apparent distortions in computer graphical images in order to improve the viewing experience, but these often rely on special equipment and systems to track the position and behaviour of the viewer in order to calculate the correct viewing angle for any given object. Moreover, they generally operate by manipulating the pixel array of the 2D image generated from the 3D model rather than modifying the geometrical properties of the objects themselves. Other methods have been developed to determine shape constancy for images of 3D objects, but these are directed to the problem of recovering 3D models from 2D images, or related machine object recognition tasks, and do not provide the method for a user to individually control the appearance of all objects in an image of a 3D scene in order to satisfy the criteria of perceptual constancy. Such methods usually rely on standard projective geometry to model the rendering of light paths to the image plane.

The present invention discloses a method of modifying a 2D image representing a 3D scene in order to preserve perceptual constancy of objects in the scene the method including the steps:

processing an image of a 3D scene to generate an unmodified view of the 3D scene and one or more objects within the scene;

selecting one or more objects from within the scene;

determining a modified view of the one or more objects;

comparing the modified view of the one or more objects with the unmodified view of the one or more objects;

interpolating one or more stages between the unmodified view and modified view of the one or more objects;

selecting an interpolation stage for the one or more objects;

generating a new 3D scene with the selected interpolated one or more objects; and, projecting and rendering the new 3D scene into a 2D image onto a display.

In an embodiment the unmodified view of the 3D scene and objects comprises spatial coordinates, colour, texture, surface mapping data, motion data, object identification data, or other data necessary to represent a 3D scene.

In an embodiment the unmodified view of the 3D scenes and one or more objects is generated using a standard geometry, the standard geometry including linear or curvilinear perspective.

In an embodiment including a further step wherein the image of a 3D scene is defined by a user.

In an embodiment the selection of the one or more objects is made either manually by a user or according to preprogrammed parameters.

In an embodiment the modified view of the one or more objects is determined by reference to an orthographic view of the object.

In an embodiment the modified view of the one or more objects is determined by reference to stored values specifying the modified view of the object.

In an embodiment the modified view of the one or more objects is determined by reference to user-defined parameters specifying the modified view.

In an embodiment the modified view of the one or more objects is determined by a preprogrammed algorithm. Wherein the algorithm used to determine the modified view of a object is a machine learning algorithm which autonomously calculates the parameters required to generate the modified view of the object, or, wherein the algorithm used to determine the modified view of a object is modified by stored semantic data about the 3D scene or one or more objects in the scene, the stored sematic data including object names, functions or relationships to other objects.

In an embodiment comparing the unmodified view and the modified view of the one or more objects produces a value that represents the differences between the two views. Wherein if the value of this difference is greater than an amount determined by the user or preprogrammed value then a further step is executed, or, wherein if the value is less than an amount determined by the user or preprogrammed value, then no further modification is made to the one or more objects.

In an embodiment interpolating one or more stages between the unmodified view and modified view comprises interpolating the spatial coordinates, and other relevant 3D data, between the unmodified view of the object and the modified view in order to generate a number of stages of the object distributed between the unmodified view and the modified view.

In an embodiment the number of interpolated stages for each of the one or more objects is determined by a user or according to preprogrammed parameters.

In an embodiment the selection of interpolation stage is based on stored values or preprogrammed parameters.

In an embodiment a user selects the desired stage of the object from among the interpolated stages.

In an embodiment further including the step of converting the unmodified view and modified view into mathematical matrices before interpolation.

In an embodiment including a further step of controlling the spatial proximity of the selected interpolated objects to one another within the new 3D scene.

In an embodiment the degree of apparent curvature in the one or more objects in a 3D scene that is projected using a curvilinear geometry, can be modified by comparing the apparent curvature of the one or more objects to the original geometry of the 3D scene and interpolating between these geometries to a stage specified by a user or preprogrammed parameters.

In an embodiment a user can define an optimum view for a given one or more objects as stored values such that these are used as a reference when rendering objects to a 2D image in order to preserve perceptual constancy.

In an embodiment including the step of allowing a user to specify how the appearance of a object in a scene might change over the course of an animated sequence of frames.

In an embodiment applying the steps disclosed in the method either individually or in combination will result, in an image of the 3D scene in which objects retain their perceptually constant size and shape, or are closer in size and shape, to perceptual constancy than would be the case when subjected to the distortions introduced by the standard projection geometry used to render the 3D scene to 2D.

The invention may be performed in various ways and embodiments thereof will now be described, by way of example only, reference being made to the accompanying drawings, in which.

Figure 1:
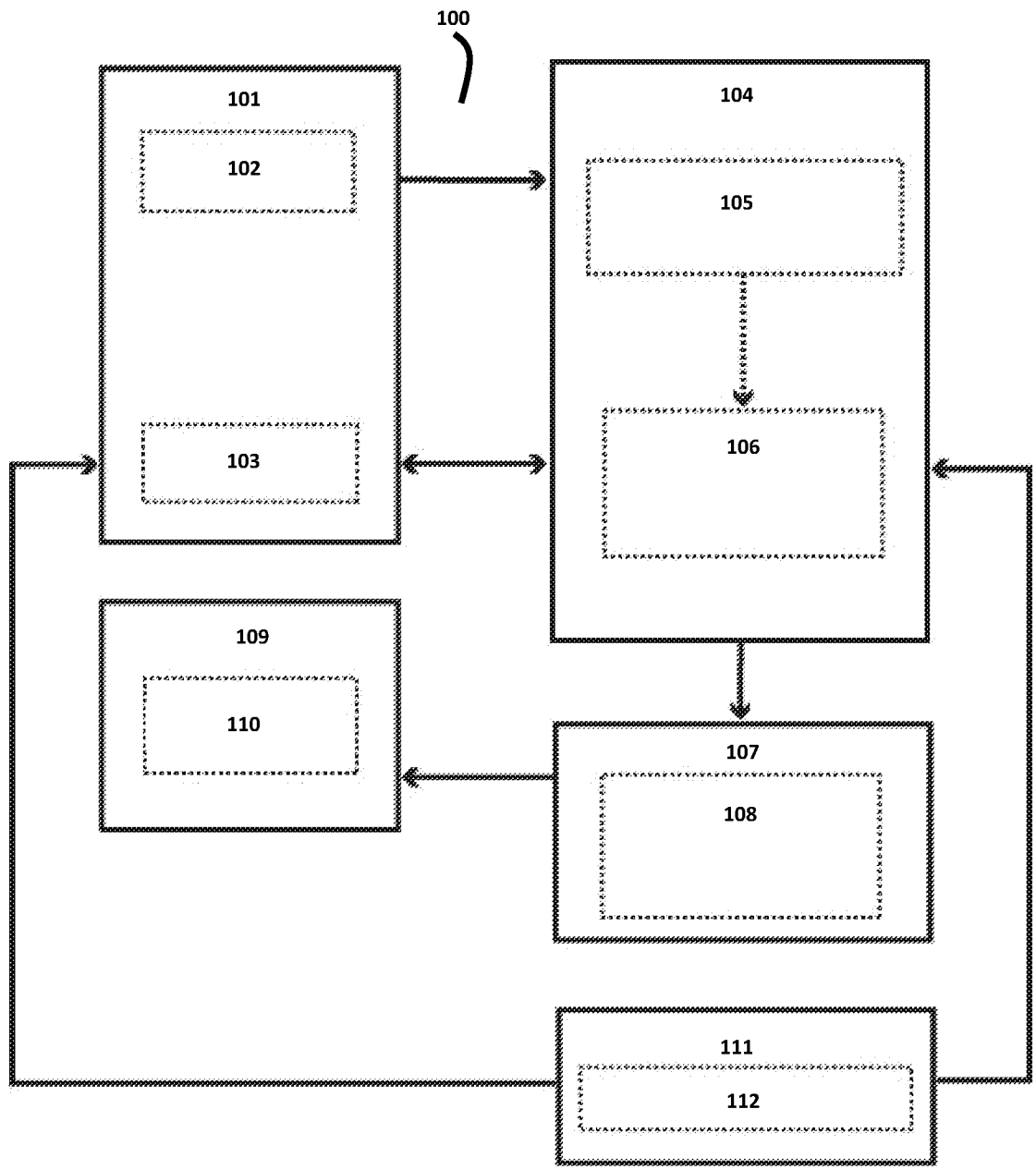
FIG. 1 is a schematic flow chart of the present method embodied in a computational device.

Referring to FIG. 1 of the drawings, there is shown an embodiment of the present method 100. In the method the Computer Memory 101 stores the data used to model the 3D scene 102, and passes this to the Central Processor 104. Within the Central Processor, alone or in parallel with the Graphics Processor 107, a number of computational procedures 105 are performed on the 3D data in order to carry out the steps disclosed in the present method. Further details of these steps are specified in FIG. 4. Once these procedures are completed a projection of the 3D scene is generated 106 by the Central Processor 104, either alone 106 or in concert 108 with the Graphics Processor 107. The projection is passed to the Graphics Processor 107 and used to render 110 to the Image Display 109. The User Control Interface 111 provides a series of buttons and sliders that pass values 112 to the Central Processor in order to allow the user to modify the settings for the parameters in the device embodying the method that determine the appearance of the 3D scene on the Image Display 109. The settings for these parameters 103 can be stored in the Computer Memory 101, and passed directly to the Central Processor 104 in order to be used to automatically control the modifications executed by a device embodying the present method.

Figure 2:
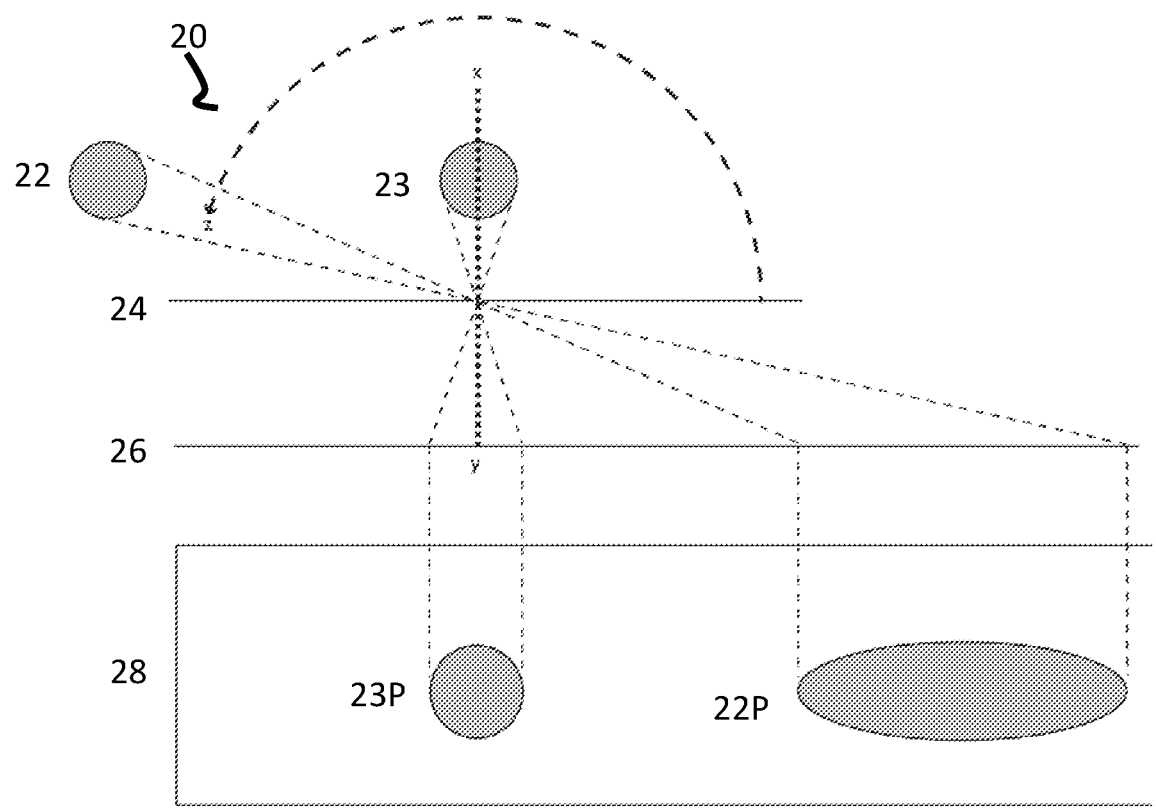
FIG. 2 is a schematic diagram of the geometry of linear perspective.

FIG. 2 is a schematic diagram 20 of the geometry of linear perspective. This diagram shows that in order to create an image of a wide angle of view of the spheres 22 and 23 it is necessary to project light rays that subtend small angles with respect to the projection plane, with the result that the image of the peripherally located sphere 22 in the scene appears elongated in the horizontal axis compared to the centrally located one 23. The result is that perceptual constancy for the image of the sphere 22P is lost. The angle of view in this illustration is 160°, which is less than the normal width of the human binocular visual field, which is approximately 180°. Increasing the angle of view above 160° would further increase the apparent distortion, and so further diminish perceptual constancy.

In theory, perceptual constancy of the sphere 22 projected to 22P in this example could be preserved if the image 28 were to be viewed from a sufficiently close distance, that is, at the correct centre of projection of the light rays. The reason is that at this point the pattern of light rays reaching the retina of the viewer would closely match the pattern of light paths than would be projected from the real scene. However, in most practical situations, and especially for wide-angle images, the correct centre of projection is too close to the image surface for the normal human eye to focus comfortably. Therefore, linear perspective projections of the kind shown in the figure are not a viable method for accurately or comfortably depicting objects in wide angled views, nor for preserving perceptual constancy in images.

Figure 3:
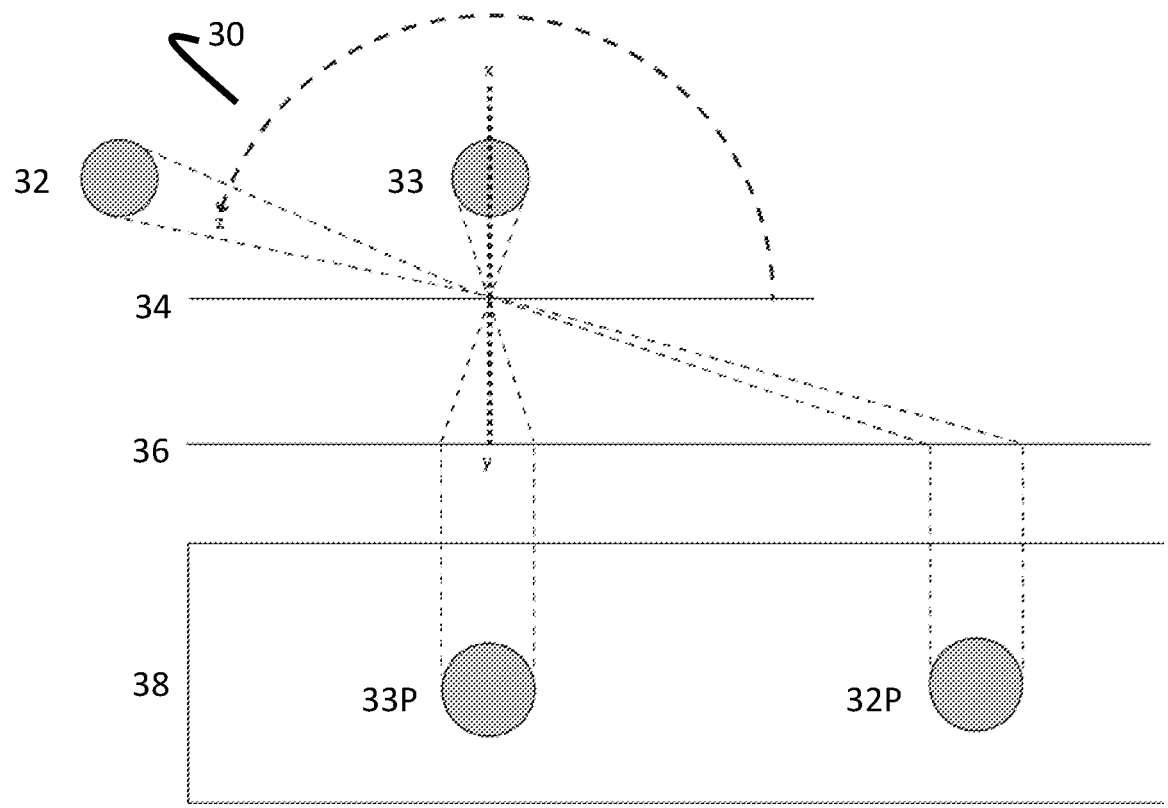
FIG. 3 is a schematic diagram of the general principle disclosed in the present method.

FIG. 3 is a schematic diagram 30 of the general principle disclosed in the present method. For the purposes of illustration only, the sphere 32P in the image 38 is shown without the distortion apparent in FIG. 2. In this example, the trajectory of the light paths from the sphere 32 do not take a linear path to the projection plane 36. This contravenes a central principle of linear perspective, and indeed similar conventional projective geometry used to model the behaviour of light in computational devices. What is gained by contravening this principle, however, is the ability to modify the appearance of objects in order to preserve perceptual constancy for images viewed at more comfortable distances than would be the case in standard linear perspective.

Note that camera lenses, and similar optical devices, can be used to deflect the paths of physical light rays projecting from an object to the projection plane in order to modify the appearance of an image. Thus in principle the projection of sphere 32/32P shown in FIG. 3 could be achieved using a suitably designed lens in a device such as camera, or in a computer graphics system by using a computationally simulated lens. However, the physical properties of physical or simulated lenses are such that it would be impossible or impractical to alter the light paths in the same way on an object-by-object basis for a 3D scene as disclosed in the present method when applied to a 3D model of a scene, or to re-project light paths that are occluded by other objects in a 2D projection of a scene. So, for example, light paths that are occluded in a fisheye lens projection of a scene, and therefore not recorded in the resulting image, cannot be recovered by modifying the 2D geometry of the image. Moreover, the present method would in principle allow objects to be modified on a part-by-part basis, or on the basis of semantic information such as object names or meanings, or on the basis of pre-defined hierarchies of clustered objects or composite objects.

Figure 4:
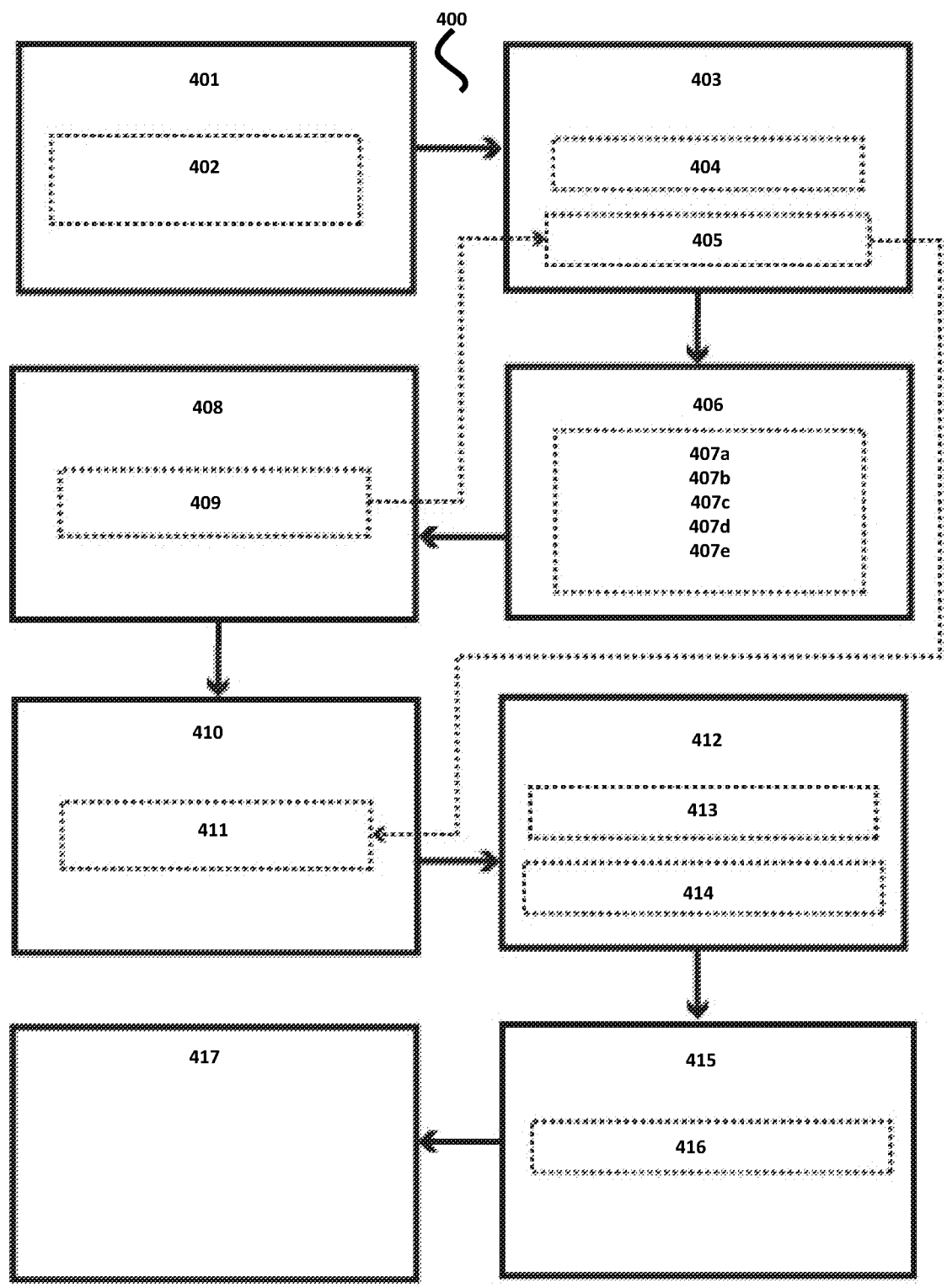
FIG. 4 is a schematic flow chart of the main steps disclosed in the present method; and, FIG. 5 shows an embodiment of the User Control Interface.

FIG. 4 outlines the steps 400 disclosed in the present method. By way of illustration only, in one embodiment of the method the computational device first 401 generates a standard unmodified 2D projection of the 3D data that models the scene using computational functions pre-programmed into the device embodying the method. This would normally be a linear perspective projection, but may also be a curvilinear projection, such as a fisheye projection. In either event, the projection will be constructed using the principle of straight path projection of light rays landing on a flat or nearly flat surface, through a single fixed aperture. The viewpoint of the scene, i.e. the position from which the computationally-modelled camera renders the scene, including the field of view of said camera and other relevant properties, would be set by the user 402 of the device embodying the system via a suitable interface, including a suitable image display on which to view the output.

In a further step 403, an object or objects are selected from within the scene for modification according to the present method. An object in this case may be defined as an arrangement of 3D coordinates and other relevant data that is computationally linked in such a way as to form a discrete entity within the global space of the 3D environment. An object may also be defined as a discrete area or region of coordinates and other relevant data within a 3D environment.

The object(s) to be modified may be selected either manually by a user of the device 404 embodying the method, via a computer interface device, such as a computer mouse, a digital pen, or similar device, or by the device itself using pre-programmed parameters 405. The device determines which object(s) are selected by applying a suitable algorithm 405, which is enacted if there is a difference between the standard unmodified view of the object(s) and the constant modified view, as measured by further steps in the method 406-409, exceeds a threshold pre-programmed into the device. This decision 409 is indicated by a dashed line directed to the 'Object(s) selected by device' box 405. Once selected by this process, the object(s) are then passed to a further step in the method to be interpolated 410, this being indicated by the dashed line directed at a 'Mathematical procedure' 411.

In a further step 406, the constant modified view of the object is determined by the device according to any suitable function pre-programmed into the device, including by way of example but not limited to:

Generating an orthographic projection of the object(s) 407a,

Referring to a look up table or database of predefined views of the object(s) and stored in a suitable memory device 407b, Referring to parameters defined or set by a user of the device and stored in suitable memory device 407c, Applying an algorithm that is pre-programmed, or generated by a suitable machine learning procedure, which calculates the constant modified view according to criteria encoded into the algorithm or acquired by the machine learning procedure 407d, Referring to semantic data computationally associated with the object(s) and stored in a suitable memory device, such as object name, function, emotional valence, symbolic significance, or other property having been encoded into the system using a suitable process. In this case the semantic properties of the object(s) can be used to determine the amount of constancy correction applied in the device, or the order of priority in which such corrections are applied 407e.

Using one or some combination of these functions 407, or other suitable functions, a constant modified view of the object(s) is mathematically generated and stored in suitable location in the device embodying the method.

In a further step 408, the constant modified view of the object(s) is compared to the standard unmodified view of the object(s) using a suitable mathematical procedure 409. A value is derived from this procedure that represents the differences between the two views. If the value of this difference is greater than an amount determined by the user of the device, or by a suitable algorithm programmed into the device as defined above, then a further step is executed. If the difference is less than an amount determined by the user of the device, or by a suitable algorithm programmed into the device, then no further modification is made to the object(s).

In a further step 410, the spatial coordinate data and other relevant data used to generate the standard unmodified and the constant modified views of the object(s) are allocated to separate mathematical matrices. A mathematical procedure is then executed that interpolates between the two matrices 411, the number of interpolation stages being set by the user or by criteria pre-programmed into the device, such that the standard unmodified view is mathematically transformed into the constant modified view by a number of stages.

In a further step 412, the required interpolation stage is selected, either by a user via a suitable interface 413, or using a suitable mathematical procedure programmed into the device embodying the method 414. The choice of interpolation made by the device will be based on criteria stored in a suitable look up table, or on the basis of which most closely approximates the standard unmodified and constant modified view of the object(s) in the current projection of the scene, as defined using a mathematical function pre-programmed into the device.

In a further step 415, a new projection of the 3D scene incorporating the modified views of the object(s) is generated by a suitable mathematical procedure, within which step the user can determine 416 the extent to which modified object(s) are constrained to maintain their spatial proximity to other objects in the scene, such that objects that are touching in the original 3D model of the scene remain touching in the modified projection of the scene.

In a further step 417, the modified view of the scene is rendered, via suitable computational processes, to the image display for viewing.

In addition to the steps disclosed above, further steps may be applied in the present method to improve the appearance or layout of an image of a 3D scene, or may improve the functionality of any device embodying the method, including but not limited to:

A function that allows the user to specify how the appearance of an object in a scene might change over the course of an animated sequence of frames.

A function that allows the degree of apparent curvature in an object in a scene that is projected using a curvilinear geometry, such as a fisheye projection, to be modified by a device embodying the method by comparing the apparent curvature of the object's topology in the 2D image to the original topology of the 3D model. The device embodying the method interpolates between these topologies to a degree specified by a user, pre-programmed into the device, such that the original form of the object is restored, or partially restored.

A function that allows a user or preprogrammed device embodying the method, via a suitable control interface, to define the optimum view for a given object or set of objects and store these definitions in the device as a database. The device then uses this database as a reference when rendering an object or objects to an image in order to rectify any apparent distortions in that occur when the scene is projected to an image.

Figure 5:
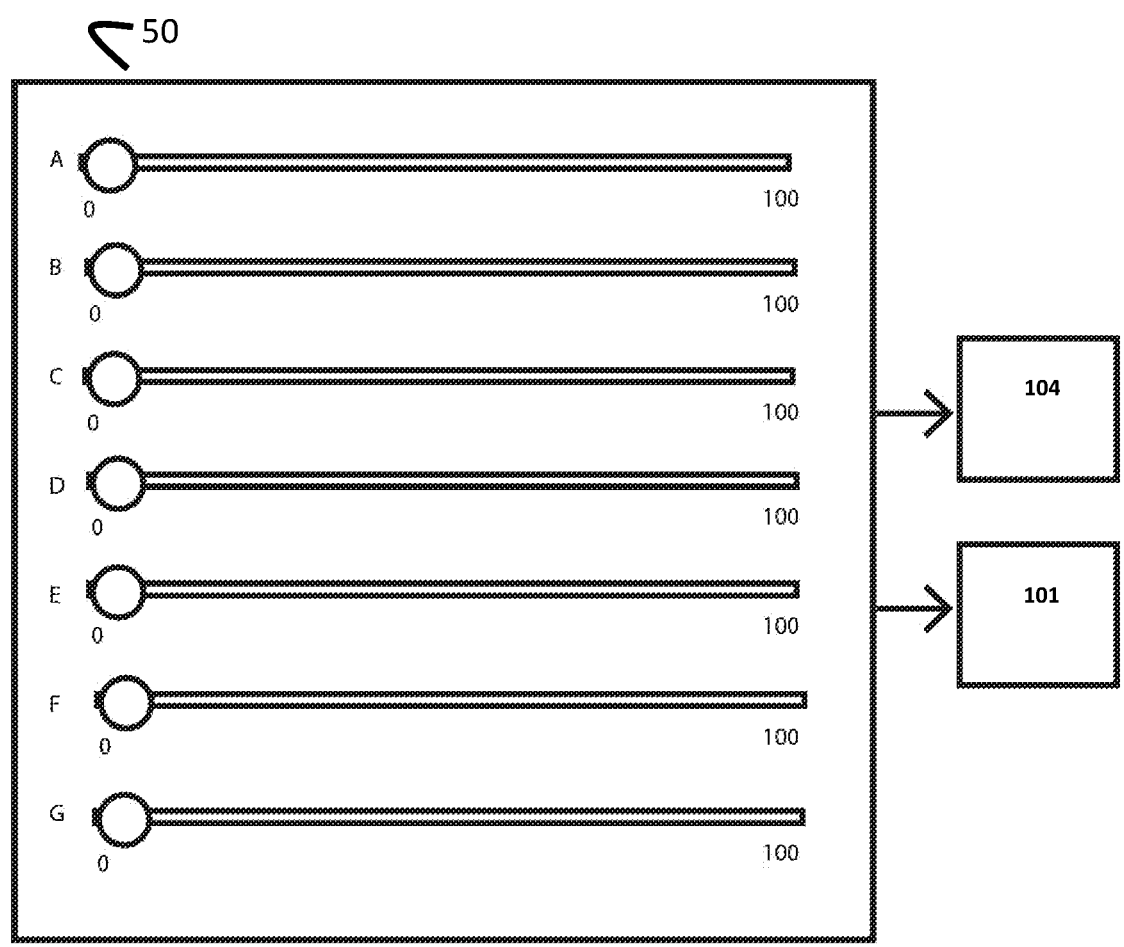

FIG. 5 shows one configuration of the user control interface 50, for the purposes of illustration only. In this embodiment a series of sliders are presented to the user each of which controls a function within the steps disclosed in the present method. By way of illustration, slider A controls the horizontal angle of view of the projection of the 3D scene, with 0 being 20° and 100 being 180°; slider B controls the threshold at which the computed difference between the standard unmodified and constant modified views triggers a further modification of the constant modified view; slider C controls the number of interpolation stages applied in the transformation between the standard unmodified and constant modified views; slider D controls the degree of interpolation used in the final rendered image; slider E controls the extent to which the constant modified view of an object deviates from its original proximity to other objects in the scene; slider F controls how much modification can be applied to each object between animated frames; slider G controls the amount of apparent curvature permitted in the final render of the scene.

The invention claimed is:

1. A method of modifying a 2D image representing a 3D scene in order to preserve perceptual constancy of objects in the 3D scene the method comprising:

processing, at a processor, the 2D image of the 3D scene to generate an unmodified view of the 3D scene and of one or more objects within the 3D scene;

selecting, at the processor, the one or more objects from within the 3D scene;

determining, at the processor, a modified view of the one or more objects;

comparing, at the processor, the modified view of the one or more objects with the unmodified view of the one or more objects;

interpolating, at the processor, one or more stages between the unmodified view and modified view of the one or more objects, resulting in one or more interpolated stages;

selecting, at the processor, a particular interpolated stage for the one or more objects from the one or more interpolated stages;

generating, at the processor, a new view of the 3D scene with the selected particular interpolated stage for the one or more objects; and, projecting and rendering, at the processor, the new view of the 3D scene into the 2D image onto a display.

2. The method of claim 1, wherein the unmodified view of the 3D scene and of the one or more objects comprises spatial coordinates, color, texture, surface mapping data, motion data, object identification data, or other data necessary to represent the 3D scene.

3. The method of claim 1, wherein the unmodified view of the 3D scenes and of the one or more objects is generated using a standard geometry, wherein the standard geometry includes linear or curvilinear perspective.

4. The method of claim 1, wherein the 2D image of the 3D scene is defined by a user via a user interface.

5. The method of claim 1, wherein the one or more objects are selected, either manually by a user via a user interface or according to preprogramed parameters.

6. The method of claim 1, wherein the modified view of the one or more objects is determined by reference to an orthographic view of the one or more objects.

7. The method of claim 1, wherein the modified view of the one or more objects is determined by reference to stored values specifying the constant view of the one or more objects.

8. The method of claim 1, wherein the modified view of the one or more objects is determined by reference to user-defined parameters specifying a constant view of the one or more objects.

9. The method of claim 1, wherein the modified view of the one or more objects is determined by a preprogramed algorithm.

10. The method of claim 9, wherein the preprogramed algorithm used to determine the modified view of the one or more objects is modified by stored semantic data about the 3D scene or the one or more objects in the scene, the stored sematic data including object names, functions, or relationships to other objects.

11. The method of claim 1, wherein comparing the unmodified view and the modified view of the one or more objects produces a value that represents differences between the unmodified view and the modified view of the one or more objects.

12. The method of claim 11, wherein if the value of the differences between the unmodified view and the modified view of the one or more objects is greater than an amount determined by a user or preprogramed value, then a further step is executed.

13. The method of claim 11, wherein if the value is less than an amount determined by a user or preprogramed value, then no further modification is made to the one or more objects.

14. The method of claim 1, wherein interpolating the one or more stages between the unmodified view and modified view comprises interpolating spatial coordinates, and other relevant 3D data, between the unmodified view of the one or more objects and the modified view of the one or more objects in order to generate a number of interpolated stages for each of the one or more objects distributed between the unmodified view and the modified view.

15. The method of claim 14, wherein the number of interpolated stages for each of the one or more objects is determined by a user via a user interface or according to preprogramed parameters.

16. The method of claim 1, wherein the particular interpolated stage is selected based on stored values or preprogramed parameters.

17. The method of claim 1, wherein a user selects a desired stage of the one or more objects from among the one or more interpolated stages.

18. The method of claim 1, further comprising converting, at the processor, the unmodified view and the modified view of the one or more objects into mathematical matrices before interpolation.

19. The method of claim 1, further comprising controlling, at the processor, spatial proximity of the one or more objects in the selected interpolated stage to one another within the new view of the 3D scene.

20. The method of claim 1, wherein a degree of curvature in the one or more objects in the 3D scene projected using a curvilinear geometry is modified by comparing the curvature of the one or more objects to an original geometry of the 3D scene and interpolating between the curvature and the original geometry to a stage specified by a user via a user interface or preprogramed parameters.

* * * * *